United States Patent
Fernstrom et al.

(10) Patent No.: US 10,173,908 B2
(45) Date of Patent: Jan. 8, 2019

(54) LIQUID TREATMENT APPARATUS COMPRISING AN AIR TRAP VESSEL

(71) Applicant: WALLENIUS WATER AB, Stockholm (SE)

(72) Inventors: Henrik Fernstrom, Ingaro (SE); Johan Bergqvist, Saltsjo-Boo (SE)

(73) Assignee: WALLENIUS WATER INNOVATION AB, Stockholm (SE)

( * ) Notice: Subject to any disclaimer, the term of this patent is extended or adjusted under 35 U.S.C. 154(b) by 0 days.

(21) Appl. No.: 15/531,179

(22) PCT Filed: Nov. 16, 2015

(86) PCT No.: PCT/SE2015/051223
§ 371 (c)(1),
(2) Date: May 26, 2017

(87) PCT Pub. No.: WO2016/085386
PCT Pub. Date: Jun. 2, 2016

(65) Prior Publication Data
US 2018/0037475 A1 Feb. 8, 2018

(30) Foreign Application Priority Data
Nov. 27, 2014 (SE) ...................... 1451442

(51) Int. Cl.
*C02F 1/32* (2006.01)
*F04D 9/00* (2006.01)
(Continued)

(52) U.S. Cl.
CPC ............. *C02F 1/325* (2013.01); *F04D 9/001* (2013.01); *F04D 29/708* (2013.01); *C02F 1/20* (2013.01)

(58) Field of Classification Search
CPC ........ C02F 1/325; C02F 1/32; C02F 2201/32; A61L 2/10; A61L 9/20
See application file for complete search history.

(56) References Cited

U.S. PATENT DOCUMENTS

| | | | | |
|---|---|---|---|---|
| 2,469,616 A | * | 5/1949 | Tidd ...................... | F24D 19/083 237/56 |
| 3,971,947 A | * | 7/1976 | Lambert ................ | A01K 63/04 250/437 |

(Continued)

FOREIGN PATENT DOCUMENTS

| AU | 606534 B2 | 2/1991 |
|---|---|---|
| WO | WO-2012056249 A1 | 5/2012 |

OTHER PUBLICATIONS

International Search Report PCT/ISA/210 for International Application No. PCT/SE2015/051223 dated Nov. 16, 2015.

*Primary Examiner* — Wyatt Stoffa
(74) *Attorney, Agent, or Firm* — Harness, Dickey & Pierce, PLC (57) ABSTRACT

A liquid treatment apparatus (2), comprising a pumping device (3) configured to pump a liquid (4) to be treated into at least one treatment chamber (6) comprising treatment equipment (9) configured to perform UV-light treatment of the liquid (4) flowing through the at least one treatment chamber (6). The liquid treatment apparatus (2) comprises an air trap vessel (5) arranged upstream of said pumping device (3) and provided with an inlet connection (22) for receiving liquid (4) to be treated and a first outlet connection (24) for connection and liquid supply to said pumping device (3). The air trap vessel (5) is configured to prevent air bubbles from being sucked into the pumping device (3) and to be at least partly filled with a priming liquid (23) before the pumping device (3) is started and the liquid treatment is (Continued)

initiated, and that the first outlet connection (24) being arranged below surface level of the priming liquid.

13 Claims, 6 Drawing Sheets

(51) Int. Cl.
 *F04D 29/70* (2006.01)
 *C02F 1/20* (2006.01)

(56) References Cited

U.S. PATENT DOCUMENTS

| | | | | |
|---|---|---|---|---|
| 4,237,004 A | * | 12/1980 | Helke | C02F 1/283 210/221.2 |
| 4,307,474 A | * | 12/1981 | Choy | E03D 9/038 222/424.5 |
| 5,124,131 A | | 6/1992 | Wekhof | |
| 5,186,830 A | * | 2/1993 | Rait | B01D 29/03 210/232 |
| 5,441,179 A | * | 8/1995 | Marsh | B67D 1/07 210/172.6 |
| 5,503,800 A | * | 4/1996 | Free | C02F 1/325 250/432 R |
| 5,625,194 A | | 4/1997 | Stitzel et al. | |
| 5,626,768 A | | 5/1997 | Ressler et al. | |
| 5,725,757 A | * | 3/1998 | Binot | A61L 2/10 210/105 |
| 5,928,506 A | * | 7/1999 | Bae | C02F 1/003 210/123 |
| 6,139,726 A | * | 10/2000 | Greene | C02F 9/005 210/175 |
| 6,193,894 B1 | * | 2/2001 | Hollander | A61L 2/10 210/748.11 |
| 6,200,466 B1 | * | 3/2001 | Bender | A61L 2/088 210/103 |
| 6,497,840 B1 | * | 12/2002 | Palestro | A61L 9/20 250/432 R |
| 6,803,587 B2 | * | 10/2004 | Gadgil | A61L 2/10 250/432 R |
| 7,425,272 B2 | | 9/2008 | Butters et al. | |
| 9,040,938 B2 | * | 5/2015 | Duineveld | C02F 1/325 202/158 |
| 2005/0000911 A1 | * | 1/2005 | Thorpe | C02F 1/325 210/748.12 |
| 2006/0006104 A1 | * | 1/2006 | Cary | C02F 1/006 210/167.01 |
| 2006/0192136 A1 | * | 8/2006 | Gadgil | A61L 2/10 250/432 R |
| 2008/0067414 A1 | * | 3/2008 | Cassassuce | C02F 1/325 250/435 |
| 2008/0245092 A1 | * | 10/2008 | Forsberg | E03B 3/28 62/288 |
| 2012/0085691 A1 | * | 4/2012 | Cummins | C02F 9/00 210/192 |

\* cited by examiner

LIQUID TREATMENT APPARATUS COMPRISING AN AIR TRAP VESSEL

This application is a national phase under 35 U.S.C. § 371 of PCT International Application No. PCT/SE2015/051223 which has an International filing date of Nov. 16, 2015, which claims priority to Swedish Application No. 1451442-6, filed Nov. 27, 2014, the entire contents of each of which are hereby incorporated by reference.

TECHNICAL FIELD

The present invention relates to a liquid treatment apparatus according to the preamble of the independent claim.

BACKGROUND

There are many applications where UV light sources are used for treating liquids. The applicant of the present application, Wallenius Water AB in Sweden, has developed and is selling water treatment equipment having a water purifier comprising an elongated tubular treatment chamber with an inlet and an outlet. In the center of the treatment chamber a light generally tubular quartz glass is arranged and inside the quartz glass a UV source, such as a lamp capable of generating wavelengths in the UV region. Low pressure UV lamps offer great efficiency and find particular application e.g. in the disinfection of water. Examples of different types of low pressure lamps include e.g. ozone-free mercury low pressure lamps, mercury ozone-generating low pressure lamps, and U-shaped lamps which supply high power in a compact design.

The inner surface of the treatment chamber of the water treatment equipment may be covered with catalytic material, such as titanium dioxide, which catalysts promotes and increases the amount of treatment material. The treatment equipment also comprises a pumping device which pumps liquid from the tank into the treatment chambers.

One type of treatment reactor developed by the applicant comprises a treatment chamber having oppositely arranged in- and outlets, where the UV light sources are arranged in elongated quartz glass tubes. These tubes are arranged perpendicular to the flow of liquid to be treated through the treatment chamber.

Similar arrangements are also described by others within the field as exemplified by the following.

U.S. Pat. No. 5,625,194 relates to an apparatus for continuous cleaning of tubular lamp wells for UV-light producing lamps.

U.S. Pat. No. 7,425,272 relates to a system for cleaning protective sleeves in UV decontamination systems. The disclosed system for cleaning the outer surface of a quartz sleeve is based on the recognition that providing a honing material with a predetermined abrasiveness through the annulus at high velocity works to remove aggregated particles from the outer surface. In U.S. Pat. No. 7,425,272 the linear velocity of a slurry material passing through the annulus during a cleaning process is about 1 m/s, and in one particular example it is stated that the velocity is at least 0.5 m/s.

Also U.S. Pat. Nos. 5,124,131 and 5,626,768 relate to UV-radiation treatment systems and methods were a liquid is moved along a UV-radiation source.

It is a known problem that air in the liquid which is pumped through the pumping device into the liquid treatment arrangement may badly influence the function of the pump. Today this problem has been solved by different special arrangements, and by taking a number of different actions. For example, nozzles may be arranged at specific locations through which it is possible to withdraw air from the tubing, and from other parts of the system. In addition, the connection tubing must be arranged such that no air is trapped within the tubes.

However, there is still a need in the art for improved liquid treatment apparatuses for purifying liquids which do not suffer from problems associated with malfunctioning of the pump of the apparatus.

SUMMARY OF THE INVENTION

The above-mentioned object is achieved, or at least mitigated, by the present invention according to the independent claim. Preferred embodiments are set forth in the dependent claims.

Hence, there is provided herein a liquid treatment apparatus, comprising a pumping device configured to pump a liquid to be treated into at least one treatment chamber comprising treatment equipment arranged to treat liquid flowing through the at least one treatment chamber, wherein the liquid treatment apparatus comprises an air trap vessel arranged upstream of said pumping device and provided with an inlet connection for receiving liquid to be treated and a first outlet connection for connection and liquid supply to said pumping device, directly or indirectly. The air trap vessel is configured to be at least partly filled with a priming liquid before the pumping device is started to prevent air bubbles from being sucked into the pumping device. The first outlet connection is arranged below a surface of the priming liquid when the air trap vessel is at least partly filled with the priming liquid.

Accordingly, an air trap vessel is arranged upstream to the pumping device and the liquid passes the air trap vessel before it is supplied to the pumping device. The air trap vessel is typically a cylinder having a circular cross-section. An inlet connection is arranged at the top and an outlet connection is arranged at the bottom of the air trap vessel. Before the liquid treatment is started by starting the pumping device to pump in liquid to be treated to the treatment chamber, the air trap vessel is filled with a priming liquid, e.g. water. Air, primarily in the connection tubing, is sucked into the air trap vessel when the pump is started and air is thereby trapped in the vessel and not sucked into the pump. Hence, the apparatus presented herein hence obviates problems encountered with previous arrangements where air bubbles have entered the pumping device causing interference with the treatment of the liquid.

The air trap vessel is configured to prevent air bubbles from being sucked into said pumping device, e.g. by using a damping plate, such as a horizontally arranged plate attached in an upper part of the air trap vessel to damp and distribute the liquid supplied via the inlet connection. The damping plate is attached to the inner walls and facilitates for damping the vertical force of the liquid in order to prevent air bubbles from being sucked out from the vessel via the outlet connection. The liquid passes the plate e.g. at openings along the periphery of the plate in close proximity to the inner wall of the vessel. Air bubbles may also be prevented from being sucked into the pumping device by the inlet of the air trap vessel being arranged so that the liquid entering the air trap vessel is damped against an inner surface of the vessel.

The volume of the air trap vessel is related to the specific application, e.g. to the length of the tubing to the tank including the liquid to be treated. In one embodiment the volume is in the range of 13-20 liters, e.g. 15 liters.

The liquid treatment apparatus may be further improved by including the air trap vessel in a treatment apparatus as presented herein. The liquid treatment apparatus will be easier to install in that a user simply arranges the tubing such that liquid may be sucked from, and returned to the tank including the liquid to be treated, and then presses the start button. No specific notice needs to be taken whether there is air in the system that might compromise the pumping function. The treatment apparatus preferably comprises a mounting socket on which the pumping device, air trap vessel and treatment chamber are mounted. The liquid treatment apparatus may further comprise a tube bracket assembly which comprises two elongate tubes, an outlet and an inlet tube, preferably arranged in parallel and detachably attached to the apparatus.

SHORT DESCRIPTION OF THE APPENDED DRAWINGS

FIGS. 7a-7g shows various views of an air trap vessel according to an embodiment of the present invention.

FIG. 7e is a cross-sectional view along line A-A in FIG. 7a.

DETAILED DESCRIPTION

The present invention will now be described with references to the appended figures. Throughout the figures the same, or equivalent, items will have the same reference signs. Generally, the present invention relates to a liquid treatment apparatus 2 intended for treating a liquid 4, e.g. cutting liquid, with UV-light. The apparatus will now be described with references to FIGS. 1-5.

Figure 1:
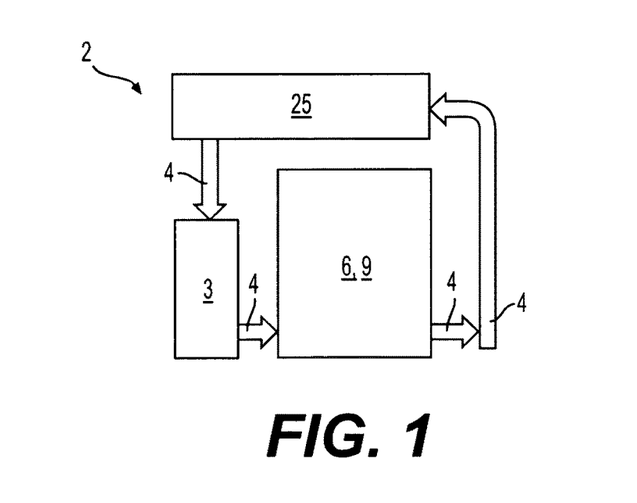
FIG. 1 is a schematic illustration of a liquid treatment apparatus according to the present invention further illustrating how the liquid flows from the tank through the apparatus and back to the tank after the treatment.
Figure 2:
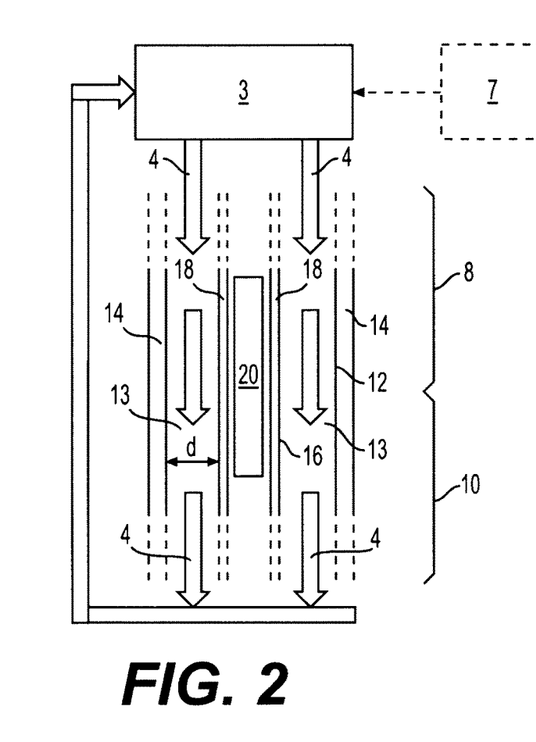
FIG. 2 is a schematic illustration of a liquid flow through a pumping device and treatment chamber/treatment equipment of the liquid treatment apparatus according to the present invention.
Figure 3:
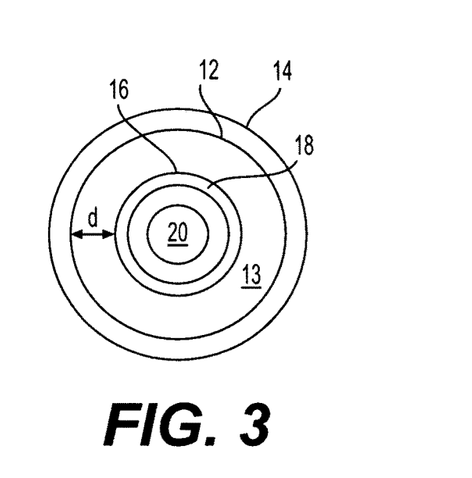
FIG. 3 is a cross-sectional view of a treatment chamber according to an embodiment of the present invention.

The apparatus is configured for light treatment of a liquid 4 flowing through at least one, preferably vertically arranged, treatment chamber 6 having an upper, or first, end 8 and a lower, or second, end 10. More specifically, the treatment equipment 9 is arranged to perform UV-light treatment of the liquid 4. The treatment chamber 6 is defined as a first elongated circumferential hollow cavity 13 between an inner wall 12 of a housing 14 and an outer wall 16 of a translucent sleeve 18 arranged to protect and include a lamp 20.

Preferably, the lamp 20 is a UV-lamp of a fluorescent tube type. Preferably, the lamp 20 is also a low pressure lamp. The lamp has preferably an elongated shape in the form of a tube and having an essentially circular cross-section. The distance d between the inner wall 12 and the outer wall 16 is chosen, among other things, in dependence of different parameters of the liquid (e.g. the opacity) and is normally in the range of 2-10 mm. An exemplary length of the elongated treatment chamber is in the range of 150-200 cm.

The liquid treatment apparatus also comprises a pumping device 3 configured to pump the liquid to be treated from a tank 25 via a tube, e.g. a flexible tube, into the at least one treatment chamber 6. The pumping device 3 has an inlet connection 22 (see FIGS. 4 and 5) through which the liquid 4 is sucked from a tank 25 with liquid 4 to be treated and further to the treatment chamber 6. The pumping device 3 can also be arranged downstream of the treatment chamber 6. The liquid 4 flows, at a flow rate velocity, through the treatment chamber(s) 6 where it is subjected to UV-radiation. The treated liquid 4 is then returned to the tank 25 via another tube. Preferably, the pumping device 3 is configured to flow said liquid 4 through the hollow cavity 13 at a velocity such that the velocity of the fluid 4 in relation to the outer surface of the sleeve 16 prevents fouling and/or scaling from aggregating on the outer surface of the sleeve 16. A recirculation assembly 42 is configured to recirculate the fluid through the hollow cavity 13.

Figure 4:
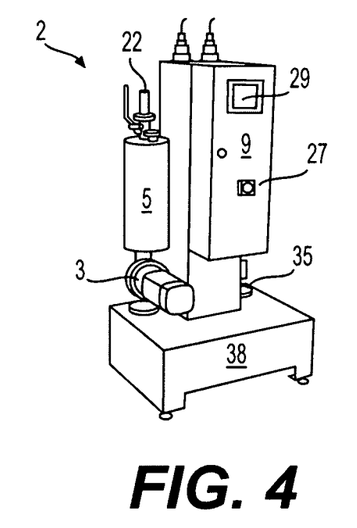
FIG. 4 is a front view of a liquid treatment apparatus according to an embodiment of the present invention.
Figure 5:
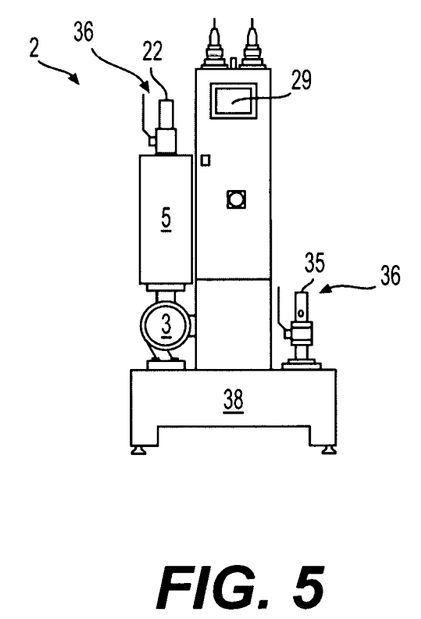
FIG. 5 is a perspective view of a liquid treatment apparatus of an embodiment according to the present invention.

FIG. 4 is a front view, and FIG. 5 is a perspective view of a liquid treatment apparatus 2 according to one embodiment of the present invention. The apparatus includes a mounting socket 38 on which the pumping device 3, an optional air trap vessel 5 and treatment equipment 9 are mounted. The treatment equipment 9 including treatment chambers 6, e.g. two or four, is mounted within a protective enclosure. A control panel 29 is provided at the front side of the enclosure, and also a safety disconnector 27. Inlet and outlet connectors 22, 35 are arranged for connection to tubes to the tank with the liquid to be treated. Electrical connectors are provided for electrical supply of the UV-lamps. The apparatus is controlled by a control unit 7, e.g. a dedicated processing device or a computer, via control instructions applied via the control panel 29.

With references to FIGS. 6-9 various embodiments of the present invention will now be described in detail, and specifically FIG. 7 illustrate various views of the air trap vessel and damping member according to one embodiment.

Figure 6A:
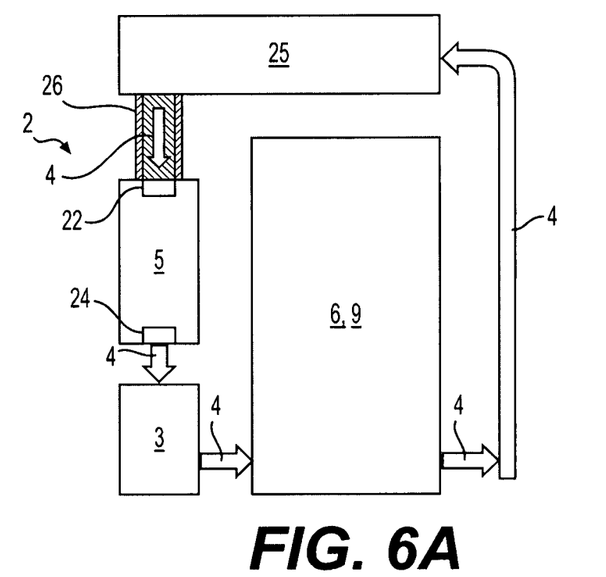
FIG. 6a is a schematic illustration of a liquid treatment apparatus according to the present invention illustrating how the liquid flows from the tank through the apparatus and back to the tank after the treatment.
Figure 6B:
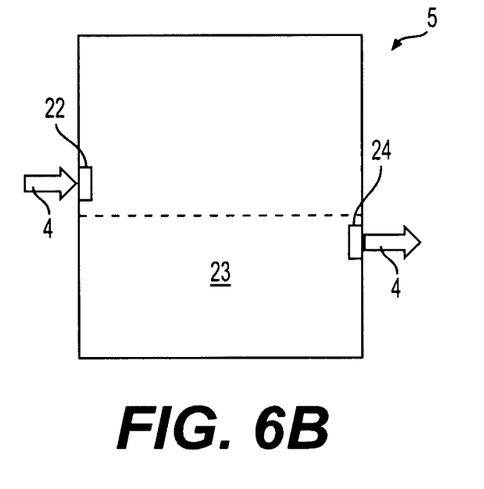
FIG. 6b is a schematic illustration of comprising an air trap vessel according to one embodiment of the present invention.

More specifically, and as schematically illustrated in FIGS. 6a and 6b, there is in a first aspect of the invention provided a liquid treatment apparatus 2, comprising a pumping device 3 configured to pump a liquid 4 to be treated into at least one treatment chamber 6 comprising treatment equipment 9 arranged to treat liquid 4 flowing through the at least one treatment chamber 6. The liquid treatment apparatus 2 further comprises an air trap vessel 5 arranged upstream of the pumping device 3 and provided with an inlet connection 22 for receiving liquid 4 to be treated and a first outlet connection 24 for connection and liquid supply to said pumping device 3. The air trap vessel is further at least partly filled with a priming liquid 23 before the pumping device 3 is started in order to prevent air bubbles from being sucked into said pumping device 3, and thereby preventing any air bubbles from disturbing the function of the pump. The first outlet connection 24 is arranged below the surface of the priming liquid to ascertain that no air is sucked into the pump.

More specifically, the air trap vessel 5 is configured to damp forces of the liquid 4 thereby preventing air from entering into the pumping device 3. This is favourable in the manner that the entry of air bubbles into the pumping device will be avoided which may interfere with the treatment of the liquid.

In the schematic illustration in FIG. 6a the air trap vessel is arranged directly upstream the pumping device. It is naturally possible, within the scope of the claims, to arrange the treatment chamber(s) between the air trap vessel and the pumping device. Furthermore, it would also be possible to arrange the treatment chamber(s) upstream the air trap vessel and the pumping device. The important aspect is that the air trap vessel is arranged upstream the pumping device.

As further shown in FIG. 6b, said first outlet connection 24 of the liquid treatment apparatus 2 is arranged below a surface of said priming liquid 23 when the air trap vessel 5 is at least partly filled with said priming liquid 23. More precisely, the opening within the vessel leading an outflow of the liquid to the first outlet connection 24 must be below the surface of the priming liquid 23.

Further, said inlet connection 22 of the liquid treatment apparatus 2 may be arranged above a surface of said priming liquid 23 when the air trap vessel 5 is at least partly filled with said priming liquid 23. The inlet connection 22 may be arranged at an upper part of said vessel 5 and the first outlet connection 24 may arranged at a lower part of the vessel 5 to facilitate flow of the liquid within and through the vessel 5.

The important aspect is that no air is sucked into the pumping device, which is achieved by providing the outlet connection such that enough liquid is sucked in order to trap the air which is present upstream the air trap vessel.

With regard to requirements of the air trap vessel, it is preferably made from metal or plastic and is essentially air-tight.

In order to damp the forces, and thereby removing the air bubbles the incoming liquid flow may be directed against an inner wall of the vessel, or be directed against a damping plate or similar arranged within the vessel.

Naturally, the air trap vessel 5 has a volume which is larger than a volume of tubing 26 between a tank including the liquid 4 to be treated and the inlet connection 22.

Figure 7A:
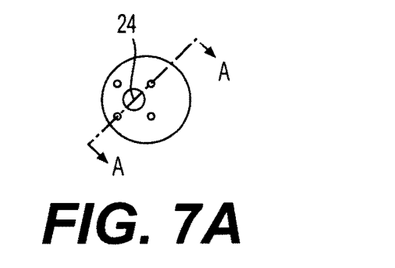
FIG. 7a is a view from below of the air trap vessel.
Figure 7B:
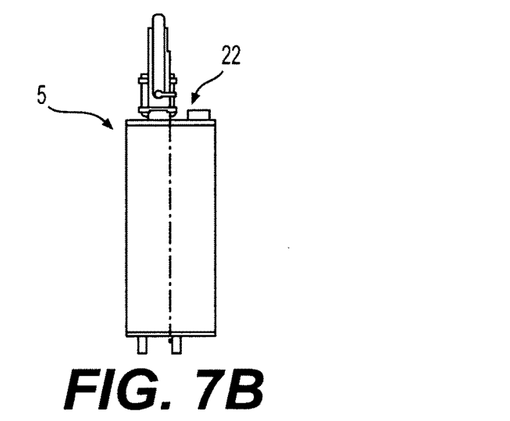
FIGS. 7b and 7c are side views of the air trap vessel.
Figure 7C:
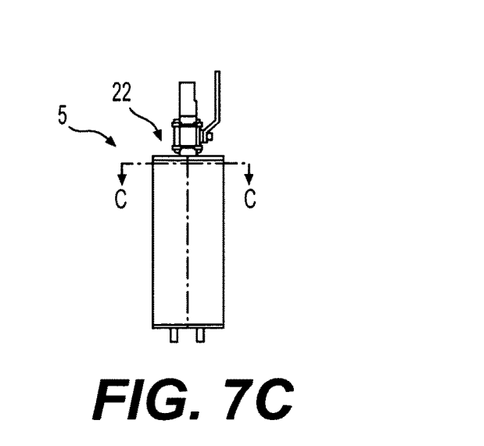
Figure 7D:
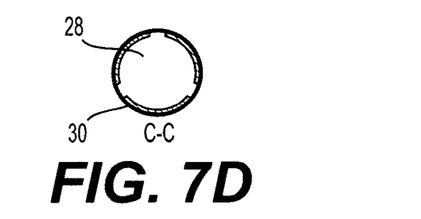
FIG. 7d is a cross-sectional view along line C-C in FIG. 7c.
Figure 7E:
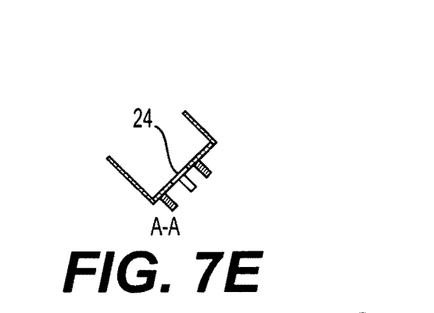
Figure 7F:
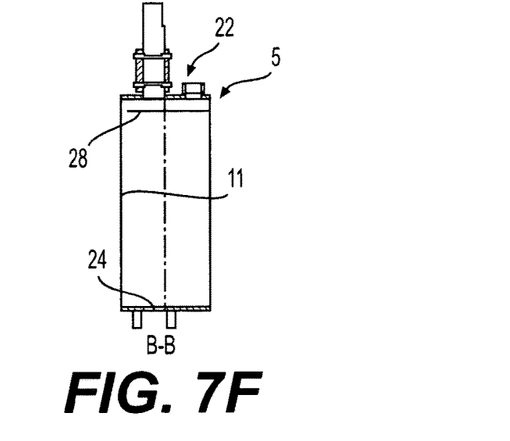
FIG. 7f is a cross-sectional view along line B-B in FIG. 7g.
Figure 7G:
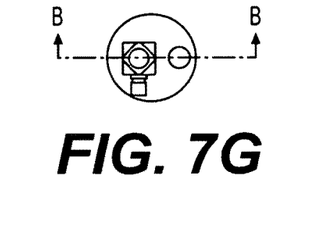
FIG. 7g is a view from above of the air trap vessel.

FIG. 7a-7g shows various views of an embodiment of an air trap vessel 5 according to the present invention. The air trap vessel 5 comprises a damping member 28 configured to damp and distribute the liquid 4 supplied via the inlet connection 22. As illustrated in FIG. 7f, the damping member 28 is arranged below the inlet connection 22 and above the outlet connection 24.

FIG. 7d shows a cross-sectional view along line C-C in FIG. 7c, showing the damping member 28, wherein the damping member 28 is an essentially horizontally arranged damping plate 28.

In FIG. 7f, it is shown that the damping member 28 is arranged in an upper part of the air trap vessel 5, and attached to the inner walls 11 of the air trap vessel 5 facilitating for damping vertical forces of the liquid 4 in order to prevent air bubbles from being sucked out from the vessel 5 via the outlet connection 24 at the bottom of the vessel.

FIG. 7d further shows that the damping plate 28 being provided with at least one opening 30 through which the liquid 4 may pass the plate 28. The liquid is then transported into and through the pumping device 3 and further into the treatment chamber 6. The at least one opening 30, in the illustrated embodiment three openings are provided, is preferably arranged along the periphery of the plate 28 in close proximity to the inner wall 11 of the air trap vessel 5. In the illustrated embodiment, the air trap vessel 5 is a cylinder having a circular cross-section.

Figure 8:
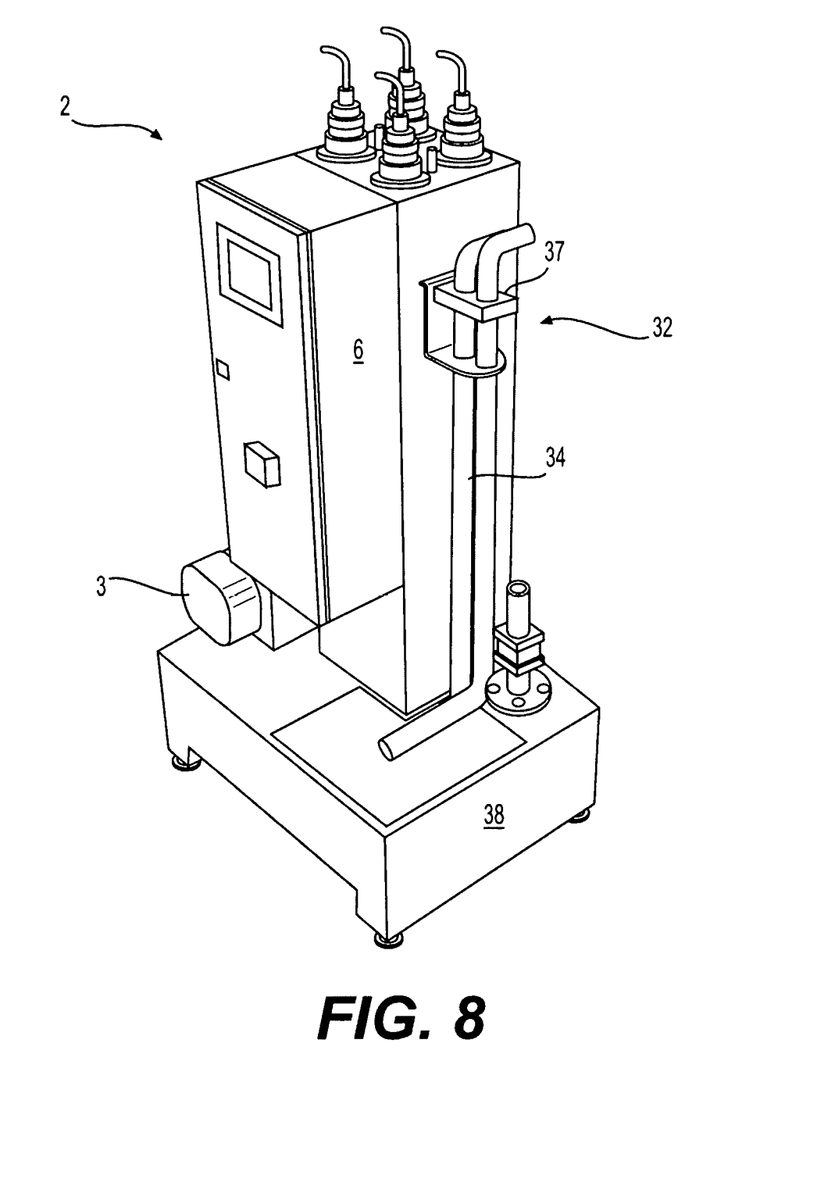
FIG. 8 is a perspective view of a treatment apparatus according to an embodiment of the invention illustrating the positioning of the tube bracket assembly on the treatment apparatus.

FIG. 8 shows a liquid treatment apparatus according to one embodiment of the invention, wherein the apparatus further comprises a tube bracket assembly 32. The tube bracket assembly 32 comprises two elongate tubes 34 arranged in parallel, an inlet tube 31 and an outlet tube 33, wherein the tube bracket assembly 32 is detachably attached to the apparatus 2. This is advantageous in that the tube bracket assembly is easily transported together with the apparatus, and is accessible when the apparatus should be installed. During use the tubes are vertically mounted within the tank including the liquid 4 to be treated. The tubes 34 are configured to be connected to the inlet connection 22 and a second outlet connection 35 of said liquid treatment apparatus 2 via flexible tubes (not shown).

Figure 9A:
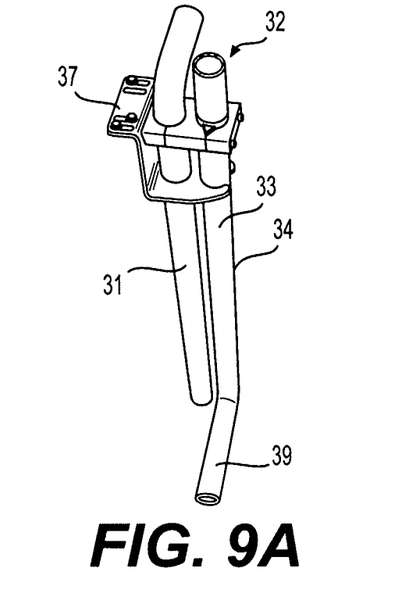
FIGS. 9a and 9b show a tube bracket assembly comprising the elongate tubes according to one embodiment of the invention.
Figure 9B:
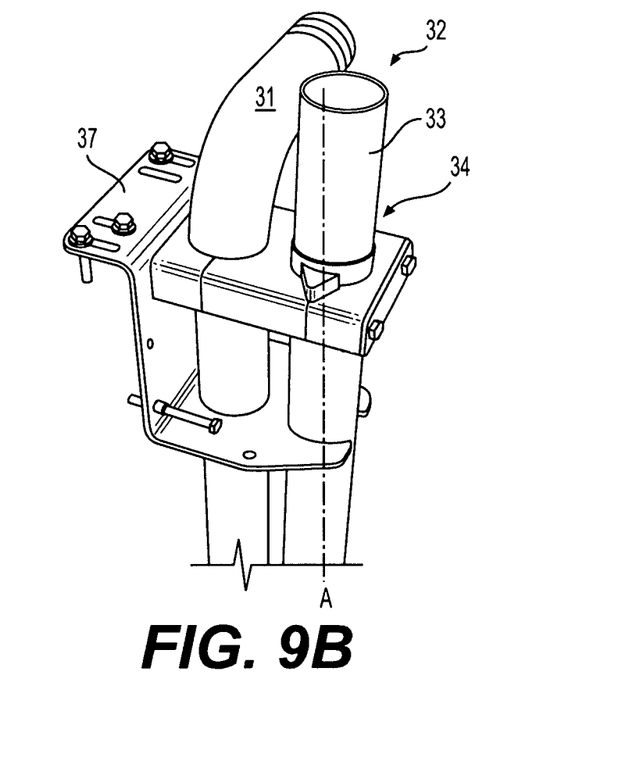

FIG. 9 shows the tube bracket assembly 32 in more detail, wherein the structure of the tubes 31, 33 and an attachment arrangement 37 is illustrated.

Accordingly, the tube bracket assembly 32 is preferably provided with an attachment arrangement 37 at one end. The attachment arrangement 37 is configured both to attach the tube bracket assembly 32 to the apparatus 2 during transportation, and also to facilitate easy mounting on an upper edge of a tank including liquid to be treated. When mounted the connection pipes of the outlet tube 33 (for liquid flowing from the tank to the liquid treatment apparatus) and inlet tube 31 (for liquid flowing back to the tank) are above the liquid level. The lower end of the inlet tube 31 is provided with a horizontally directed outlet tube part 39 (see FIG. 9a). The outlet tube part 39 provides for an essentially horizontally directed liquid 4 flow of treated liquid 4 returning to the liquid apparatus. The inlet tube 33 is rotatable around a longitudinal axis A (essentially vertical) to achieve an optimal liquid flow within the tank e.g. directing returned liquid away from the opening of the outlet tube 31 and also with regard to mixing aspects. Thus, the rationale behind enabling rotation of the inlet tube 33 is to be able to direct the inlet flow in an optimal direction.

FIG. 8 shows an embodiment of the invention wherein the apparatus 2 has a modular configuration or design and comprises a mounting socket 38 on which said pumping device 3, vessel 5 and treatment chamber 6 are mounted. The module arrangement makes the production cheaper in that different models of the product essentially are based upon the same components, with only minor differences, e.g. the number of treatment chambers. One over-all important aspect is the small foot-print. The foot-print, i.e. the floor area covered by the product, is a half standard pallet. The lower console has a height and a structure enabling for an operator to stand on the upper surface and easily reach the upper part of the product, e.g. when changing UV-lamp.

The inlet connection 22 and second outlet connection 35 of the liquid treatment apparatus 2 may be vertically arranged such that the connection openings 36 are directed upwards, which is clearly illustrated on FIGS. 4 and 5.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A liquid treatment apparatus, comprising:
   a tank configured to hold a liquid to be treated;
   at least one treatment chamber including treatment equipment configured to perform UV-light treatment of liquid to be treated that is flowing through the at least one treatment chamber to provide treated liquid;
   a pumping device configured to pump the liquid to be treated from the tank to the at least one treatment chamber; and
   an air trap vessel between the tank and the pumping device; and
   an instance of connection tubing between the tank and the air trap vessel such that the instance of connection tubing couples the tank to the air trap vessel,
   wherein the pumping device is configured to pump the liquid to be treated from the tank to the at least one treatment chamber through the air trap vessel,
   wherein the air trap vessel includes
      an inlet connection coupled to the instance of connection tubing, such that the inlet connection is coupled to the tank via the instance of connection tubing and the inlet connection is configured to receive the liquid to be treated from the tank through the instance of connection tubing, and
      a first outlet connection configured to couple with and supply the liquid to be treated to the pumping device,
   wherein the air trap vessel is configured to be at least partly filled with a priming liquid before the pumping device is started, such that the first outlet connection is submerged below a surface of the priming liquid, to configure the air trap vessel to trap air sucked into the air trap vessel from the instance of connection tubing in response to the pumping device being started, such that the trapped air is prevented from being sucked into the pumping device to prevent air bubbles from being sucked into the pumping device via the first outlet connection,
   wherein the air trap vessel has a volume that is larger than a volume of the instance of connection tubing between the tank including the liquid to be treated and the inlet connection,
   wherein the air trap vessel is air-tight.

2. The liquid treatment apparatus according to claim 1, wherein the inlet connection is above the first outlet connection, such that the inlet connection is above the surface of the priming liquid when the air trap vessel is at least partly filled with the priming liquid such that the first outlet connection is submerged below the surface of the priming liquid.

3. The liquid treatment apparatus according to claim 1, wherein the inlet connection is at an upper part of the air trap vessel and the first outlet connection is at a lower part of the air trap vessel.

4. The liquid treatment apparatus according to claim 1, wherein the air trap vessel includes a damping member configured to damp and distribute the liquid to be treated received into the air trap vessel via the inlet connection.

5. The liquid treatment apparatus according to claim 4, wherein the damping member is below the inlet connection and is above the first outlet connection.

6. The liquid treatment apparatus according to claim 4, wherein the damping member is a horizontally arranged damping plate attached in an upper part of the air trap vessel, and
   the damping plate is attached to an inner wall of the air trap vessel and is configured to facilitate damping vertical forces of liquid to be treated in the air trap vessel to prevent air bubbles from being sucked out from the air trap vessel via the first outlet connection.

7. The liquid treatment apparatus according to claim 6, wherein the damping plate includes at least one opening configured to direct the liquid to be treated therethrough.

8. The liquid treatment apparatus according to claim 7, wherein the at least one opening is arranged along a periphery of the damping plate in close proximity to the inner wall of the air trap vessel.

9. The liquid treatment apparatus according to claim 1, wherein the air trap vessel is a cylinder having a circular cross-section.

10. The liquid treatment apparatus according to claim 1, wherein the at least one treatment chamber is a first elongated circumferential hollow cavity between an inner wall of a housing and an outer wall of a translucent sleeve, the translucent sleeve configured to protect and include a lamp.

11. The liquid treatment apparatus according to claim 1, further comprising:
   a tube bracket assembly including two elongate tubes arranged in parallel, the two elongate tubes including an inlet tube and an outlet tube,
   wherein the tube bracket assembly is detachably attached to the liquid treatment apparatus, and the tube bracket assembly is configured to be mounted within the tank,
   wherein the two elongate tubes are configured to be connected to the inlet connection and a second outlet connection of the liquid treatment apparatus.

12. The liquid treatment apparatus according to claim 1, wherein
   the liquid treatment apparatus has a modular configuration and includes a mounting socket on which the pumping device, the air trap vessel and the at least one treatment chamber are mounted.

13. The liquid treatment apparatus according to claim 1, wherein the inlet connection and a second outlet connection are vertically arranged such that both an opening of the inlet connection and an opening of the second outlet connection are directed upwards.

* * * * *